United States Patent
Ueda et al.

(10) Patent No.: US 8,448,549 B2
(45) Date of Patent: May 28, 2013

(54) TOOL POST OF MACHINE TOOL WITH ELASTICALLY DEFORMING TOOL HOLDER LOCATING DEVICE

(75) Inventors: Toshio Ueda, Ikoma-gun (JP); Masao Fukumori, Nabari (JP)

(73) Assignee: Mori Seiki Co., Ltd., Yamatokoriyama-shi, Nara-ken (JP)

( * ) Notice: Subject to any disclaimer, the term of this patent is extended or adjusted under 35 U.S.C. 154(b) by 586 days.

(21) Appl. No.: 12/728,041

(22) Filed: Mar. 19, 2010

(65) Prior Publication Data
US 2010/0251862 A1  Oct. 7, 2010

(30) Foreign Application Priority Data
Apr. 3, 2009  (JP) ................... 2009-090719

(51) Int. Cl.
*B23B 29/24* (2006.01)
(52) U.S. Cl.
CPC ..................... *B23B 29/24* (2013.01)
USPC ............................................. 82/121; 82/159
(58) Field of Classification Search
USPC . 82/121, 158, 159, 160, 161; 269/57; 24/324, 24/572.1, 573.11, 581.1, 591.1, 593.1, 594.1; 222/530, 565, 570; 279/16
IPC .............................................. B23B 29/24,29/32
See application file for complete search history.

(56) References Cited

U.S. PATENT DOCUMENTS
2006/0196325 A1  9/2006  Sakai
2008/0282861 A1*  11/2008  Miyairi et al. ............... 83/425.4

FOREIGN PATENT DOCUMENTS
JP  2006-167862 A  6/2006
WO  WO 2007/031145  *  3/2007

* cited by examiner

*Primary Examiner* — Daniel Howell
*Assistant Examiner* — Alan Snyder
(74) *Attorney, Agent, or Firm* — Smith Patent Office

(57) ABSTRACT

The present invention provides a tool post of a machine tool capable of enhancing the accuracy of positioning a tool. A positioning key 20 is fixed to an attached surface 10c formed on a tool holder 10, and a positioning block 21 fitting to the positioning key 20 is fixed to a holder attaching surface 11c formed on an outer peripheral surface 11a of a turret 11, in which the positioning key 20 is elastically deformed when it is fitted to the positioning block 21, and thereby brought into close contact with the positioning block 21.

7 Claims, 7 Drawing Sheets

MACHINE FRONT

TOOL POST OF MACHINE TOOL WITH ELASTICALLY DEFORMING TOOL HOLDER LOCATING DEVICE

BACKGROUND OF THE INVENTION

1. Field of the Invention

The present invention relates to a tool post of a machine tool including a tool holder holding a tool, a turret to which the tool holder is detachably attached, and an indexing mechanism rotary indexing and positioning the turret.

2. Description of the Related Art

In a machine tool including this kind of tool post, a tool holder is fixed to a turret with bolts while being positioned on the turret in view of enhancing the machining accuracy. As a positioning structure of such a tool holder, Japanese Patent Application Laid-open No. 2006-167862 proposes, for example, one in which a positioning flange on which a plurality of keys are formed to project is fixed to a tool holder attaching surface of the turret, and key grooves engaging with the keys are formed on a turret attaching surface of the tool holder.

SUMMARY OF THE INVENTION

Incidentally, since a slight gap required for fitting needs to be provided between each key and each key groove in the conventional positioning structure, displacement of the tool according to the gap is likely to occur, thereby raising fears of variations in positional accuracy of the tool. In this kind of tool post, the tool needs to be replaced depending on the machining condition or the like, so that it is necessary to secure the positional accuracy of the tool when repeatedly attaching and detaching the tool holder, and an improvement in this point is demanded.

The present invention has been made in consideration of the conventional situation, and an object thereof is to provide a tool post of a machine tool capable of enhancing the accuracy of positioning a tool and securing the positional accuracy of the tool when repeatedly attaching and detaching a tool holder.

The present invention is a tool post of a machine tool, including: a tool holder holding a tool; a turret having an outer peripheral surface to which the tool holder is detachably attached; an indexing mechanism rotary indexing and positioning the turret around a rotation axis of the turret such that the tool is located at a machining position; and a positioning key and a positioning block, wherein the positioning key is fixed to one of a holder attaching surface formed on the outer peripheral surface of the turret and an attached surface formed on the tool holder, and the positioning block fitting to the positioning key is fixed to another of the holder attaching surface and the attached surface, and wherein the positioning key is elastically deformed when the positioning key is fitted to the positioning block, and thereby brought into close contact with the positioning block.

According to the present invention, since the positioning key is fixed to one of the holder attaching surface of the turret and the attached surface of the tool holder, and the positioning block fitting to the positioning key is fixed to the other of them, and the positioning key is elastically deformed and thereby brought into close contact with the positioning block, the elastic deformation of the positioning key can eliminate the gap between the positioning key and the positioning block and prevent the displacement of the tool due to the gap, thereby enhancing the positional accuracy of the tool.

Further, owing to the structure eliminating the gap by elastically deforming the positioning key, the positional accuracy of the tool can be secured even when the tool holder is repeatedly attached and detached, so that a stable positioning accuracy can be attained at all times.

In a preferred embodiment of the present invention, the positioning key is fitted in a key placing part provided to be recessed in the holder attaching surface of the turret or the attached surface of the tool holder, and a portion of the positioning key fitted in the key placing part is elastically deformed and thereby brought into close contact with an inner surface of the key placing part.

According to the preferred embodiment, since the positioning key is elastically deformed and thereby brought into close contact with the inner surface of the key placing part provided to be recessed in the holder attaching surface of the turret or the attached surface of the tool holder, the elastic deformation of the positioning key can eliminate the gap between the positioning key and the key placing part, thereby enhancing the positional accuracy of the tool.

In another preferred embodiment of the present invention, the positioning key includes a pair of first fitting pieces located on a center side and a pair of second fitting pieces located outside the first fitting pieces, the first fitting piece is elastically deformed outward to be brought into close contact with the positioning block, and the second fitting piece is elastically deformed to the center side to be brought into close contact with the inner surface of the key placing part.

According to another preferred embodiment, since the pair of first fitting pieces located on the center side of the positioning key are elastically deformed outward and thereby brought into close contact with the positioning block, and the pair of second fitting pieces located outside the first fitting pieces are elastically deformed to the center side and thereby brought into close contact with the inner surfaces of the key placing part, it is possible to eliminate the gaps between the positioning key and the positioning block and the key placing part, thereby further enhancing the positional accuracy of the tool.

In still another preferred embodiment of the present invention, the positioning key is fixed to the attached surface of the tool holder, and the positioning block is fixed to the holder attaching surface of the turret.

According to still another preferred embodiment, since the positioning key is fixed to the attached surface of the tool holder, and the positioning block is fixed to the holder attaching surface of the turret, it is possible to fit the tool holder to the turret as well as to eliminate the gap.

In yet another preferred embodiment of the present invention, the positioning key is recessed in the key placing part provided to be recessed in the attached surface of the tool holder, and the positioning block projects from the holder attaching surface.

According to yet another preferred embodiment, since the positioning key is recessed in the key placing part provided to be recessed in the attached surface of the tool holder, and the positioning block projects from the holder attaching surface, it is possible to easily perform the work of positioning the tool holder.

In further another preferred embodiment of the present invention, a plurality of the positioning keys and a plurality of the positioning blocks are arranged on a straight line parallel to the rotation axis of the turret and in a manner to have a drive axis of the tool holder therebetween.

According to further another preferred embodiment, since the plurality of the positioning key and the plurality of the positioning block are arranged on the straight line parallel to the rotation axis of the turret and in a manner to hold the drive axis of the tool holder therebetween, it is possible to more securely enhance the accuracy of positioning the tool holder.

In further another preferred embodiment of the present invention, the positioning key is elastically deformed in a direction perpendicular to the rotation axis of the turret.

According to further another preferred embodiment, since the positioning key is elastically deformed in the direction perpendicular to the rotation axis of the turret, it is possible to further enhance the positional accuracy in the Y-axis direction in which the displacement of the tool is likely to occur.

DETAILED DESCRIPTION OF THE PREFERRED EMBODIMENT(S)

First Embodiment

Figure 1:
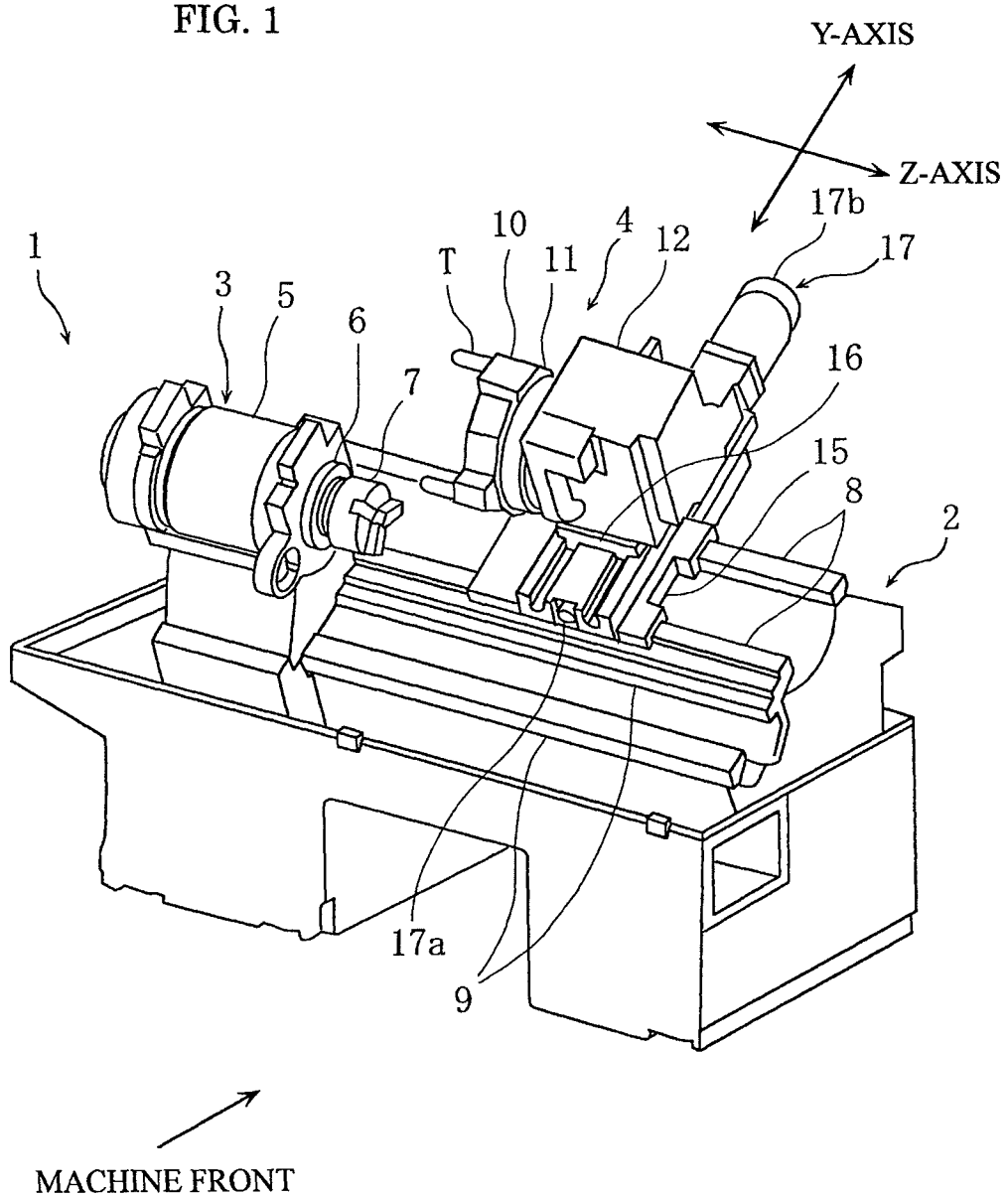
FIG. 1 is a perspective view of a machine tool including a tool post according to a first embodiment of the present invention.
Figure 2:
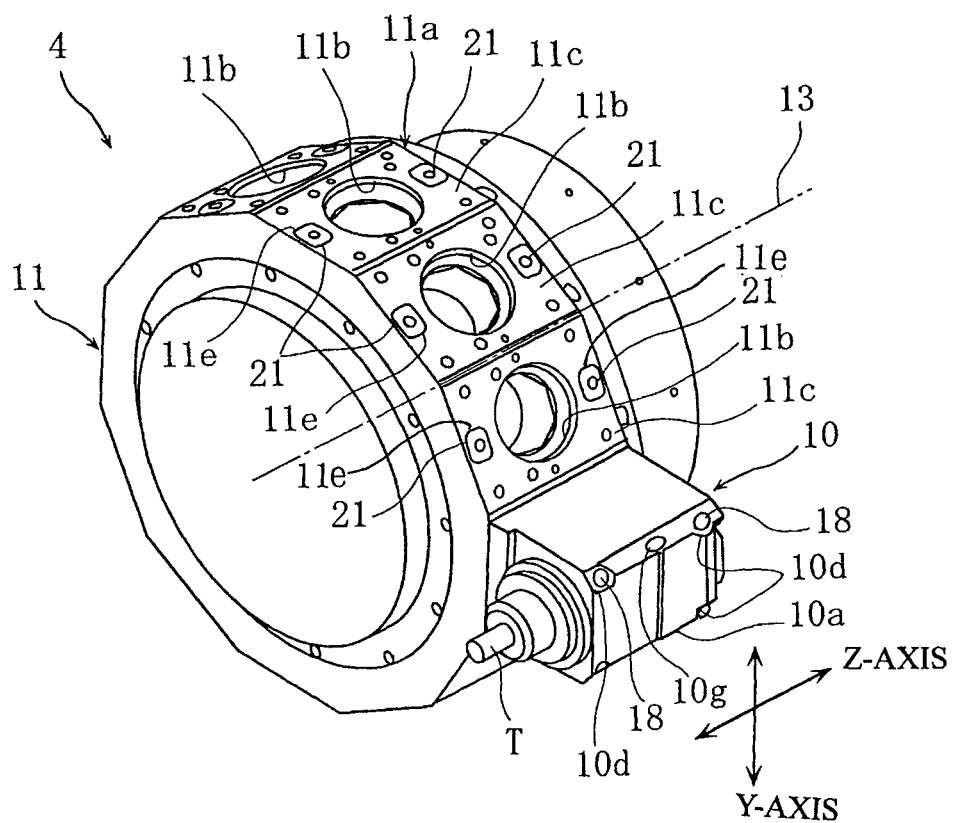
FIG. 2 is a perspective view of a turret of the tool post.
Figure 3:
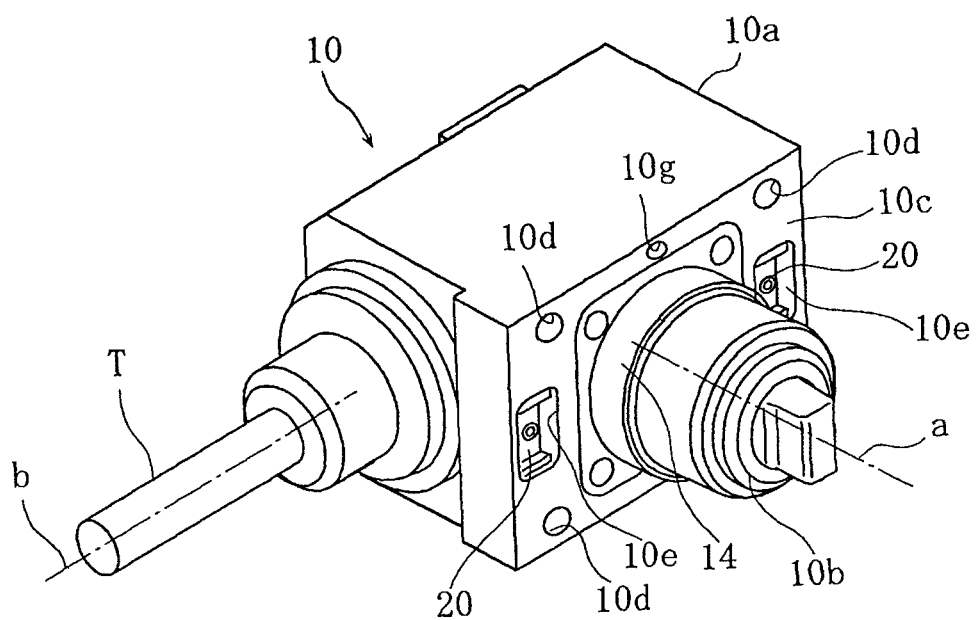
FIG. 3 is a perspective view of a tool holder of the tool post.
Figure 4:
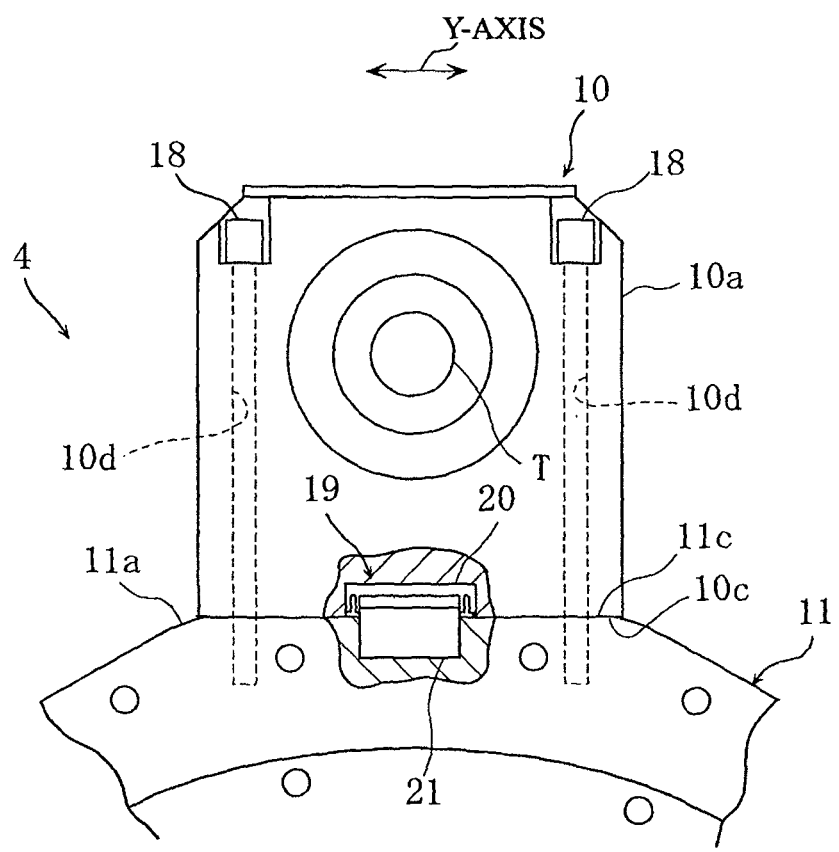
FIG. 4 is a side view of the tool post as viewed in a direction of a rotation axis thereof.

Hereinafter, embodiments of the present invention will be described with reference to the accompanying drawings.

FIG. 1 to FIG. 7 are views for explaining a tool post of a machine tool according to a first embodiment of the present invention.

In the drawings, numeral 1 denotes a lathe (machine tool). This lathe 1 includes a slant-type bed 2 extending in the lateral direction, a headstock 3 arranged at a front left end portion of the bed 2, and a tool post 4 arranged at the central back side of the bed 2, as viewed from the front of the machine.

The lathe 1 further includes a not-shown tailstock or second headstock mounted on the front right side of the bed 2 in a manner to be coaxial with the headstock 3. The tailstock or the second headstock is supported to be movable in an axial center direction (a Z-axis direction) of the headstock 3 by a pair of front guide rails 9, 9 arranged on the front side of the bed 2.

On the back side of the front guide rails 9 on the bed 2, a pair of rear guide rails 8, 8 are arranged to be parallel to the front guide rails 9. On the rear guide rails 8, a Z-axis movable base 15 is supported to be movable in the Z-axis direction, and a Y-axis movable base 16 is supported on the Z-axis movable base 15 to be movable in a Y-axis direction perpendicular to the Z-axis direction.

The Y-axis movable base 16 is reciprocated by a Y-axis feed mechanism 17 composed of a ball screw 17a and a drive motor 17b. Further, the Z-axis movable base 15 is reciprocated by a not-shown Z-axis feed mechanism.

The tool post 4 is mounted on the Y-axis movable base 16 and thereby driven to be relatively movable in the Y-axis and Z-axis directions.

The headstock 3 has a spindle head 5 fixed to the bed 2, a spindle 6 rotatably supported in the spindle head 5 and rotary driven by a drive motor (not shown) built therein, and a chuck 7 attached to the spindle 6 and detachably gripping a workpiece.

The tool post 4 includes a tool holder 10 holding a rotating tool T, a turret 11 to which a plurality of tool holders 10 are detachably attached, and an indexing mechanism 12 rotary indexing and positioning the turret 11 around a rotation axis 13 of the turret 11 such that a desired tool T is located at a predetermined machining position.

The tool holders 10 are arranged at predetermined angular intervals on an outer peripheral surface 11a of the turret 11. The indexing mechanism 12 is disposed on the rear surface of the turret 11 as viewed from the left side in the Z-axis direction, and attached to the Y-axis movable base 16.

The tool holder 10 has a holder main body 10a in a substantially rectangular parallelepiped shape rotatably supporting the rotating tool T, and a drive shaft 10b rotary driving the rotating tool T. This drive shaft 10b is disposed such that its drive axis a is disposed in a direction perpendicular to a tool center line b of the tool T, and is rotatably supported on the holder main body 10a.

The turret 11 is formed in a substantially cylindrical shape and is disposed such that its rotation axis 13 is directed to be parallel to the Z-axis.

A plurality of holder attaching surfaces 11c forming flat surfaces are formed on the outer peripheral surface 11a of the turret 11 at predetermined angular intervals, and the outer peripheral surface 11a of the turret 11 forms a polygonal shape.

Each of the holder attaching surfaces 11c is formed with an insertion hole 11b into which a boss part 14 having the drive shaft 10b of the tool holder 10 inserted therein will be inserted. The drive shaft 10b is rotary driven by a drive source (not shown) disposed in the turret 11.

On the tool holder 10, an attached surface 10c forming a flat surface is formed. The attached surface 10c is attached to the holder attaching surface 11c with a positioning mechanism 19 interposed therebetween.

At four corners of the holder main body 10a, bolt insertion holes 10d parallel to the drive axis a are formed. The tool holder 10 is fixed to the holder attaching surface 11c of the turret 11 by fixing bolts 18 inserted in the bolt insertion holes 10d (see FIG. 2 and FIG. 4)

The positioning mechanism 19 has a pair of right and left positioning keys 20, 20 fixed to the attached surface 10c of the tool holder 10, and a pair of right and left positioning blocks 21, 21 fixed to the holder attaching surface 11c of the turret 11.

Each of the positioning keys 20 is elastically deformed when it is fitted to the positioning block 21, and thereby brought into close contact with the positioning block 21, and has the following structure for detail.

The right and left positioning keys 20, 20 and positioning blocks 21, 21 are arranged on a straight line parallel to the rotation axis 13 of the turret 11 and the tool center line b, and are arranged to have the drive axis a of the tool holder 10 therebetween.

On the attached surface 10c of the tool holder 10, a pair of right and left key placing parts 10e, 10e are formed in a recess shape, and the positioning keys 20 are inserted and placed in the key placing parts 10e to be slightly recessed from the attached surface 10c.

On the holder attaching surface 11c of the turret 11, a pair of right and left block placing parts 11e, 11e are formed in a recess shape, and the positioning blocks 21 are inserted and placed in the block placing parts 11e to slightly project from the holder attaching surface 11c.

The positioning block 21 is made of metal such as steel or the like, and has press-in parts 21a, 21a fitted to the block placing part 11e with no space by being pressed into Y-axis-direction front and rear opening edge parts 11f, 11f of the block placing part 11e, and a bolt hole 21b formed at a central portion thereof.

The positioning block 21 is fixed in the block placing part 11e by a block bolt 24 inserted in the bolt hole 21b. Thus, the positioning block 21 is fixedly positioned on the turret 11 to be unmovable in the Y-axis direction.

The positioning key 20 is made of metal such as steel or the like, and has a key main body part 20a in a rectangular plate shape extending in the Y-axis direction perpendicular to the tool center line b, a pair of right and left first fitting pieces 20b, 20b located on the center side of the key main body part 20a and extending continuously from the key main body part 20a to the opening side of the key placing part 10e, and a pair of right and left second fitting pieces 20c, 20c located outside the first fitting pieces 20b of the key main body part 20a and extending continuously from the key main body part 20a to the opening side.

The right and left first and second fitting pieces 20b and 20c extend to be parallel to each other, and gaps 20d allowing elastic deformation of the first and second fitting pieces 20b and 20c are provided between the fitting pieces 20b and 20c.

A bolt hole 20e is formed at a central portion in the longitudinal direction of the key main body part 20a, and a key bolt 23 inserted in the bolt hole 20e fixes the positioning key 20 in the key placing part 10e.

Figure 5:
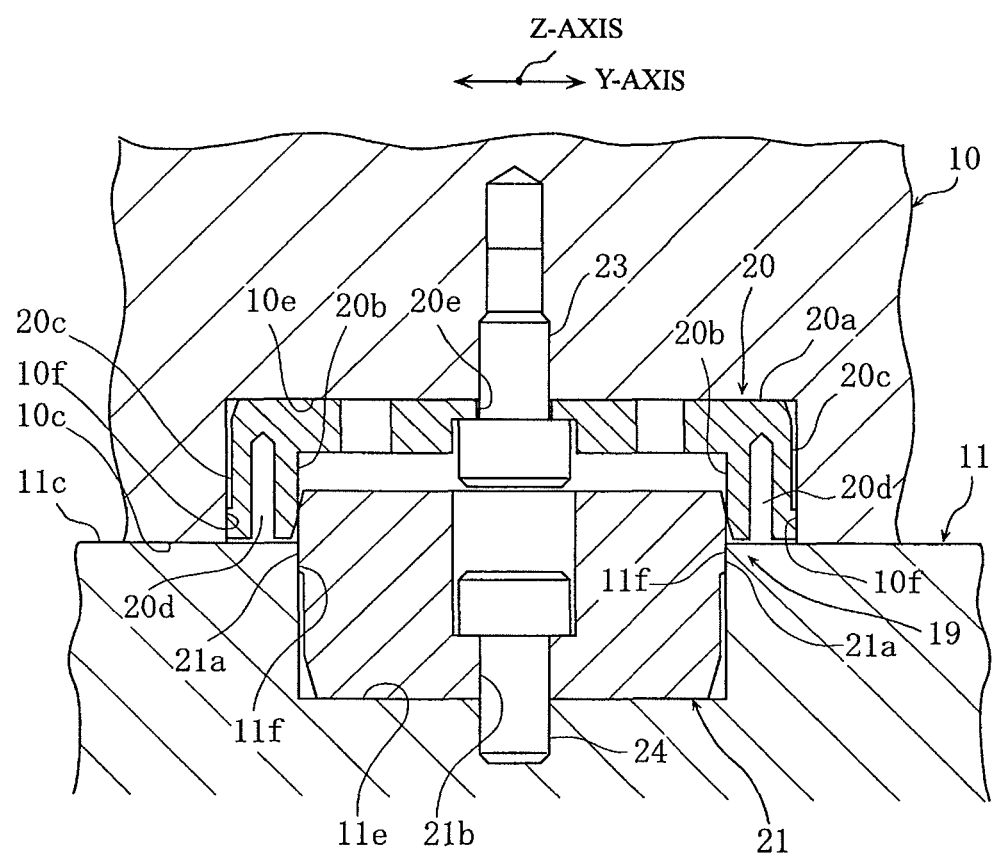
FIG. 5 is a sectional view of a positioning key and a positioning block of the tool post.
Figure 6:
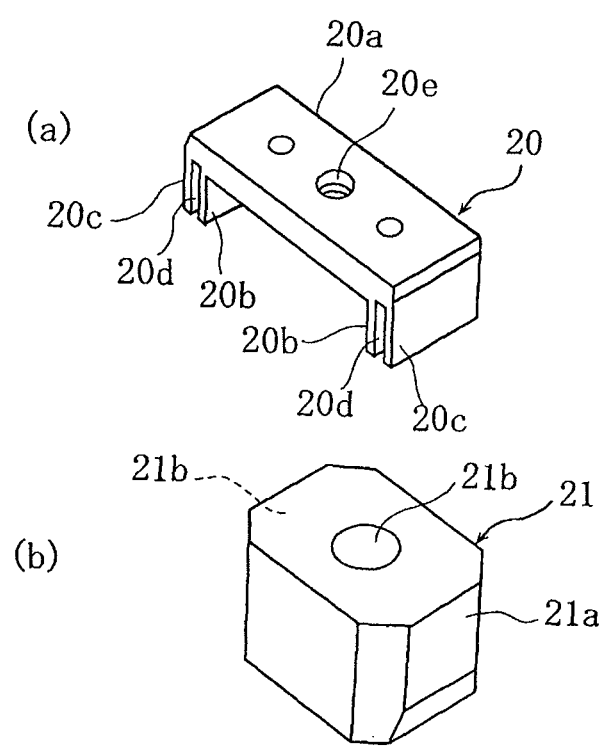
FIG. 6 is a perspective view of the positioning key and the positioning block of the tool post.

As shown in FIG. 5, the right and left first fitting pieces 20b, 20b are elastically deformed outward in the Y-axis direction (outward in the lateral direction in FIG. 5) and thereby brought into close contact with the press-in parts 21a, 21a of the positioning block 21 while being in pressure contact therewith.

Further, the right and left second fitting pieces 20c, 20c are elastically deformed inward in the Y-axis direction and thereby brought into close contact with right and left inner side surfaces 10f, 10f of the key placing part 10e while being in pressure contact therewith. The second fitting pieces 20c will be elastically deformed when the positioning key 20 is inserted and fixed into the key placing part 10e, and brought into close contact with the right and left inner side surfaces 10f.

In this manner, the positioning key 20 is elastically deformed in the Y-axis direction perpendicular to the rotation axis 13, whereby the tool holder 10 is fixedly positioned on the turret 11 to be unmovable in the Y-axis direction.

To attach the tool holder 10 to the turret 11, the attached surface 10c of the tool holder 10 is located opposing the holder attaching surface 11c of the turret 11, and the positioning blocks 21 are fitted to the positioning keys 20. Thus, the tool holder 10 is positioned on the turret 11 to be unmovable in the Y-axis direction, and fixed in this state to the turret 11 by the fixing bolts 18.

To detach the tool holder 10, a bolt (not shown) is screwed into a tap screw hole 10g formed in the holder main body 10a to bump into the holder attaching surface 11c of the turret 11 to thereby release the fit of the positioning keys 20.

According to this embodiment, the positioning keys 20 are fixed to the attached surface 10c of the tool holder 10, the positioning blocks 21 are fixed to the holder attaching surface 11c of the turret 11, and the positioning keys 20 are elastically deformed when the positioning keys 20 are fitted to the positioning blocks 21 and thereby brought into close contact with the positioning blocks 21, so that the elastic deformation of the positioning keys 20 can eliminate the gaps between the positioning keys 20 and the positioning blocks 21, prevent the displacement of the rotating tool T due to is the gaps, and accordingly enhance the positional accuracy of the tool T.

Owing to the structure in which the gap between the positioning key 20 and the positioning block 21 is eliminated by elastically deforming the positioning key 20, the positional accuracy of the tool T can be secured even when the tool holder 10 is repeatedly attached and detached, resulting in a stable positioning accuracy.

In this embodiment, since the positioning key 20 is elastically deformed and thereby brought into close contact with the right and left inner side surfaces 10f of the key placing part 10e provided to be recessed in the attached surface 10c of the tool holder 10, the elastic deformation of the positioning key 20 can eliminate the gap between the positioning key 20 and the key placing parts 10e and enhance the positional accuracy of the tool T.

In this embodiment, since the pair of right and left first fitting pieces 20b located on the center side of the positioning key 20 are elastically deformed outward and brought into close contact with the positioning block 21, and the pair of right and left second fitting pieces 20c located outside the first fitting parts 20b are elastically deformed inward and thereby brought into close contact with the right and left inner side surfaces 10f of the key placing part 10e, the gaps between the positioning key 20 and the positioning block 21 and the key placing part 10e can be eliminated and the positional accuracy of the tool T can be further enhanced.

In this embodiment, since the positioning key 20 is recessed in the key placing part 10e provided to be recessed in the attached surface 10c of the tool holder 10, and the positioning block 21 is made to project from the holder attaching surface 11c of the turret 11, the work of positioning the tool holder 10 can be easily performed.

In this embodiment, since the pair of right and left positioning keys 20 and the pair of right and left positioning blocks 21 are arranged on a straight line parallel to the rotation axis 13 of the turret 11 and to have the drive axis a of the tool holder 10 therebetween, the accuracy of positioning the tool holder 10 can be enhanced more surely.

In this embodiment, since the positioning keys 20 are elastically deformed in the Y-axis direction perpendicular to the rotation axis 13 of the turret 11, the positional accuracy in the Y-axis direction in which the displacement of the rotating tool T is likely to occur can be further enhanced. In other words, in the case of the rotating tool T, the displacement particularly due to the gap in the Y-axis direction is likely to occur. Incidentally, though variations of 15 g in to 20 μm in the Y-axis direction of a cutting point of the rotating tool have occurred in the conventional positioning structure, the variations can be suppressed to about 5 μm in this embodiment.

Second Embodiment

Figure 7:
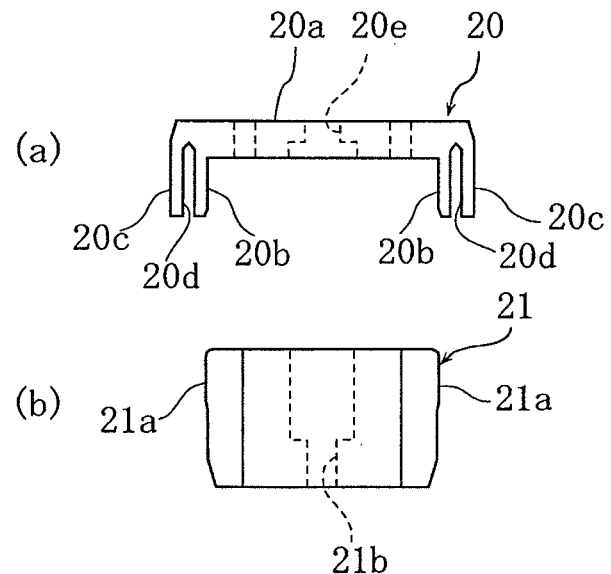
FIG. 7 is a side view of the positioning key and the positioning block.

Though a case where both of the right and left first fitting pieces 20b, 20b in FIG. 5 and FIG. 7 are elastically deformed has been described in the above first embodiment, the present invention also includes a case where only one of the right and left fitting pieces is elastically deformed.

Figure 8:
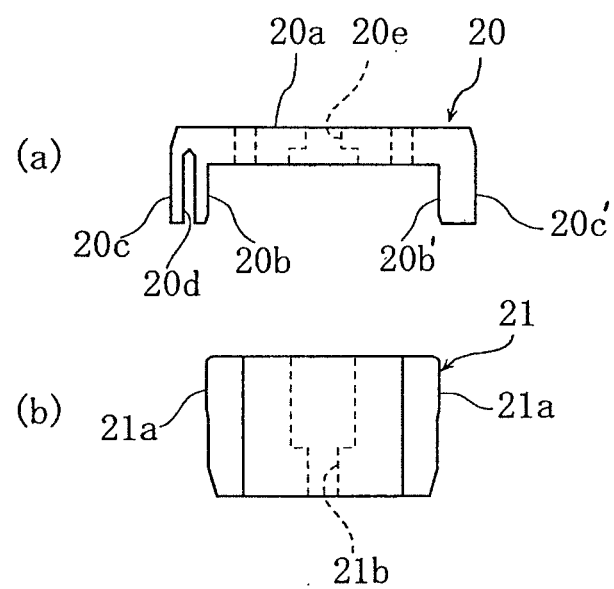
FIG. 8 is a side view of a positioning key and a positioning block according to a second embodiment of the present invention.

Specifically, as shown in the second embodiment in FIG. 8, the positioning key 20 may be configured such that only the first fitting piece 20b and the second fitting piece 20c on the left side is elastically deformed by providing no gap between a first fitting piece 20W and a second fitting piece 20c', for example, on the right side of the positioning key 20. Substantially the same operation and effect of those of the first embodiment can be achieved also in this case.

Note that though the case where the positioning keys 20 are fixed to the tool holder 10 and the positioning blocks 21 are fixed to the turret 11 has been described in the first and second embodiments, the positioning blocks may be fixed to the tool holder 10 and the positioning keys may be fixed to the turret in the present invention, and the same effect of those of the embodiments can be achieved also in this case.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

The text of Japanese priority application no. 2009-090719 filed on Apr. 3, 2009 is hereby incorporated by reference.

What is claimed is:

1. A tool post of a machine tool, comprising:
    a tool holder holding a tool;
    a turret having an outer peripheral surface to which said tool holder is detachably attached;
    an indexing mechanism rotary indexing and positioning said turret around a rotation axis of said turret such that the tool is located at a machining position; and
    a positioning key and a positioning block,
    wherein said positioning key is fixed to one of a holder attaching surface formed on the outer peripheral surface of said turret and an attached surface formed on said tool holder, and said positioning block fitting to said positioning key is fixed to another of the holder attaching surface and the attached surface, and
    wherein said positioning key is elastically deformed in a direction perpendicular to a fitting direction when said positioning key is fitted to said positioning block, and thereby brought into close contact with said positioning block.

2. The tool post of a machine tool according to claim 1,
    wherein said positioning key is fitted in a key placing part provided to be recessed in the holder attaching surface of said turret or the attached surface of said tool holder, and
    wherein a portion of said positioning key fitted in said key placing part is elastically deformed and thereby brought into close contact with an inner surface of said key placing part.

3. The tool post of a machine tool according to claim 2,
    wherein said positioning key comprises a pair of first fitting pieces located on a center side and a pair of second fitting pieces located outside said first fitting pieces,
    wherein said first fitting piece is elastically deformed outward to be brought into close contact with said positioning block, and
    wherein said second fitting piece is elastically deformed to the center side to be brought into close contact with the inner surface of said key placing part.

4. The tool post of a machine tool according to claim 1,
    wherein said positioning key is fixed to the attached surface of said tool holder, and said positioning block is fixed to the holder attaching surface of said turret.

5. The tool post of a machine tool according to claim 4,
    wherein said positioning key is recessed in said key placing part provided to be recessed in the attached surface of said tool holder, and
    wherein said positioning block projects from the holder attaching surface.

6. The tool post of a machine tool according to claim 1,
    wherein a plurality of said positioning keys and a plurality of said positioning blocks are arranged on a straight line parallel to the rotation axis of said turret and in a manner to have a drive axis of said tool holder therebetween.

7. The tool post of a machine tool according to claim 6,
    wherein said positioning key is elastically deformed in a direction perpendicular to the rotation axis of said turret.

* * * * *